UNITED STATES PATENT OFFICE.

JULIUS HOFFMANN, OF BASEL, SWITZERLAND, ASSIGNOR TO SOCIETY OF CHEMICAL INDUSTRY IN BASLE, OF BASEL, SWITZERLAND.

GRAY VAT DYE AND PROCESS OF MAKING SAME.

No. 916,154.  Specification of Letters Patent.  Patented March 23, 1909.

Application filed July 14, 1908. Serial No. 443,434.

*To all whom it may concern:*

Be it known that I, JULIUS HOFFMANN, doctor of philosophy and chemist, a citizen of the Swiss Republic, and resident of Basel, Switzerland, have invented a new and useful Gray Vat Dyestuff and a Process of Making Same, of which the following is a full, clear, and exact specification.

I have found that by heating an arylamido derivative of 2-methylanthraquinone with sulfur to a high temperature new sulfurized dyestuffs are produced, which dye unmordanted cotton in an alkaline hydrosulfite vat, gray tints fast to washing. The manufacture of these new vat-dyes is illustrated by the following examples:

Example I: 25 parts of phenylamido-2-methylanthraquinone are heated with 75 parts of sulfur to 280–290° C. for 3–4 hours. The cooled mass is finely powdered and the excess of sulfur is extracted from it by carbon disulfid or a sodium sulfid solution. The dyestuff thus obtained is a black powder which dissolves in concentrated sulfuric acid to a greenish black solution and in fuming sulfuric acid containing 24 per cent. $SO_3$ to a blackish olive solution. With alkaline reducing agents it yields a brown vat from which cotton is dyed brownish gray tints fast to washing and light.

Example II: 20 parts of diphenyl or diparatolyl-diamido-2-methylanthraquinone are heated with 60–70 parts of sulfur for about 3 hours at 280–290° C. The cooled mass is finely powdered and the mass of sulfur is extracted from it by carbon disulfid, the remaining dyestuff constituting a black powder. It dissolves in concentrated sulfuric acid to a blackish olive colored solution and in fuming sulfuric acid containing 24 per cent. of $SO_3$ to a bluish black solution. With soda lye and hydrosulfite it yields a brown vat from which cotton is dyed beautiful gray tints.

If in the foregoing examples the specified arylamido derivatives of 2-methylanthraquinone be replaced by another arylamido derivative of 2-methylanthraquinone, as for instance orthotolylamido-2-methylanthraquinone, paratolylamido-2-methylanthraquinone, alphanaphthylamido-2-methylanthraquinone, betanaphthylamido-2-methylanthraquinone, monophenyl-1:4-diamido-2-methylanthraquinone etc., dyestuffs of similar properties are obtained.

What I claim is:

1. The described process for the manufacture of gray vat-dyestuffs, which consists in heating an arylamido derivative of 2-methylanthraquinone with sulfur to a high temperature.

2. As new articles of manufacture, the vat-dyestuffs, obtainable by heating an arylamido derivative of 2-methylanthraquinone with sulfur to a high temperature, constituting, in dry state, black powders, soluble in concentrated sulfuric acid with a greenish-black to blackish olive coloration, soluble in fuming sulfuric acid of 24 per cent. $SO_3$ with a blackish olive to bluish black color, insoluble in the usual organic solvents and yielding with alkaline reducing agents brown vats dyeing cotton gray shades.

In witness whereof I have hereunto signed my name this first day of July 1908, in the presence of two subscribing witnesses.

JULIUS HOFFMANN.

Witnesses:
ERNST WAGNER,
AMAND RITTER.